(No Model.)
J. STIGMAN.
DRAFT EQUALIZER.
No. 440,287. Patented Nov. 11, 1890.
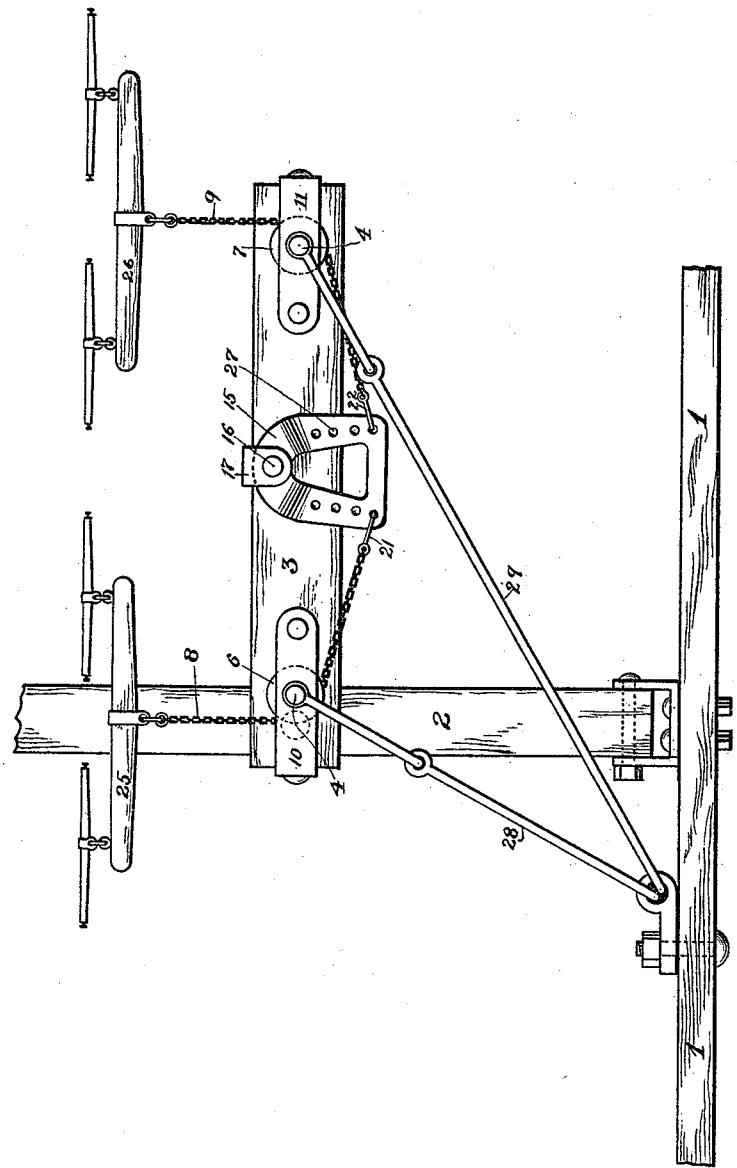
Witnesses:
C. G. Hawley.
a. m. Gaskill
Inventor:
John Stigman,
By Paul A. Emerson
Attorneys.

UNITED STATES PATENT OFFICE.

JOHN STIGMAN, OF MARIETTA, MINNESOTA, ASSIGNOR OF ONE-HALF TO ORLEY W. SAWYER, OF SAME PLACE.

DRAFT-EQUALIZER.

SPECIFICATION forming part of Letters Patent No. 440,287, dated November 11, 1890.

Application filed March 21, 1890. Serial No. 344,846. (No model.)

*To all whom it may concern:*

Be it known that I, JOHN STIGMAN, of Marietta, Lac Qui Parle county, in the State of Minnesota, have invented certain Improvements in Draft-Equalizers, of which the following is a specification.

The object of this invention is to provide an improved draft-equalizer adapted especially for use on self-binding harvesters where it is desirable to use four horses, one on one side of the pole and three on the other; and the invention consists in the construction and combination hereinafter described, and pointed out in the claim.

The drawing represents a plan view of my improved evener, showing the manner of attaching it to the binder-frame.

In the drawing, 2 represents the pole hinged in the usual manner to the binder-frame 1. A lateral branch 3 is pivoted to the pole 2 and projects from one side thereof. Clevises 11 and 10 are secured upon the ends of the branch 3, and within said clevises on said branch are arranged the wheels 6 and 7, that are secured upon studs 4, that pass through said clevises. Jointed brace-rods 28 and 29 are secured to the frame 1 at one side of the pole, and their outer ends are connected to the studs upon which the wheels are mounted. A frame 15, having a series of holes 27 at each side, is secured upon the branch 3 by means of a clevis 17 and stud 16. Chains 8 and 9 are arranged to pass around said wheel and are provided with hooks 21 and 22, adapted to hook into the holes in the frame 15. Eveners 25 and 26 are secured to the chains 8 and 9. The wheel 6 is arranged over the pole, and the evener 25 projects on both sides of said pole. The eveners 25 and 26 each carry two singletrees.

It will be seen that with this equalizer the load is properly distributed and that the load for each pair of horses may be regulated as desired.

I claim as my invention—

A four-horse equalizer composed of a pole 2, hinged to a binder-frame, a lateral branch 3, pivoted upon said pole, clamps 10 and 11 upon the ends of said branch 3, wheels 6 and 7, arranged within said clamps, studs 4, upon which said wheels are mounted, jointed brace-rods 28 and 29, secured to the binder-frame and to the studs 20, the frame 15, having the holes 27 pivoted on said branch 3, chains 8 and 9, connected to said frame and passing over said wheels, the evener 25, secured to the chain 8 and projecting on both sides of the pole, and the evener 26, secured to the chain 9, for the purpose set forth.

In testimony whereof I have set my hand this 26th day of February, 1890.

JOHN STIGMAN.

In presence of—
  F. O. SNOW,
  GEORGE WYMAN.